United States Patent [19]
Valentino

[11] Patent Number: 5,695,723
[45] Date of Patent: Dec. 9, 1997

[54] HIGH-TECH COMPUTERIZED CONTAINMENT AND TREATMENT APPARATUS AND PROCESS FOR COMBUSTION OFF-GAS

[76] Inventor: Joseph V. Valentino, 8 Saxon Wood Park Dr., White Plains, N.Y. 10605

[21] Appl. No.: 662,794

[22] Filed: Jun. 12, 1996

Related U.S. Application Data

[63] Continuation-in-part of Ser. No. 809,884, Dec. 18, 1991, which is a continuation-in-part of Ser. No. 651,656, Feb. 6, 1991, Pat. No. 5,103,742.

[51] Int. Cl.$^6$ ............................................. B01D 53/34
[52] U.S. Cl. .......................... 422/177; 110/185; 110/215; 422/171
[58] Field of Search ................................ 422/171, 178, 422/177; 110/185, 215, 345

[56] References Cited

U.S. PATENT DOCUMENTS

| | | | |
|---|---|---|---|
| 2,351,167 | 6/1944 | Ware | 585/809 |
| 3,442,232 | 5/1969 | White | 110/215 |
| 3,695,004 | 10/1972 | DeLisio et al. | 55/225 |
| 3,706,182 | 12/1972 | Sargent | 96/55 |
| 3,710,555 | 1/1973 | Domnitch | 55/225 |
| 3,984,220 | 10/1976 | Curchod | 55/238 |
| 4,095,514 | 6/1978 | Roy et al. | 454/31 |
| 4,159,201 | 6/1979 | Staege | 423/224 |
| 4,208,383 | 6/1980 | Kisters et al. | 423/215.5 |
| 4,223,614 | 9/1980 | Barkhuus et al. | 110/238 |
| 4,286,973 | 9/1981 | Hamlin et al. | 55/92 |
| 4,293,521 | 10/1981 | Isahaya et al. | 422/62 |
| 4,323,371 | 4/1982 | Ritvanen | 55/19 |
| 4,509,436 | 4/1985 | Schrofelbauer et al. | 110/345 |
| 4,635,569 | 1/1987 | Domnitch | 110/215 |
| 4,670,221 | 6/1987 | Marnet et al. | 422/107 |
| 4,909,160 | 3/1990 | Frick et al. | 110/185 |
| 5,103,742 | 4/1992 | Valentino | 110/215 |

FOREIGN PATENT DOCUMENTS 3313171  5/1984  Germany.

OTHER PUBLICATIONS

Article: "Burning Trash: How It Could Work", by Allen Hershkowitz; Technology Review, Jul. 30, 1987.

*Primary Examiner*—Timothy McMahon
*Attorney, Agent, or Firm*—Harold James, Esq.; Robert L. Epstein, Esq.; James & Franklin

[57] ABSTRACT

A substantially closed-loop system for use with a furnace wherein a fuel is burned and produces an off-gas, which system, by sensing appropriate parameters of the off-gas as it passes through the system, treats that off-gas in an optimized fashion in order to substantially eliminate the escape of contaminants and produce a substantial amount of useful by-products by one or more of (a) controlled treatment of the off-gas chemically and physically by employing a multi-flue compartmented and appropriately controlled treatment means, (b) the subsequent conversion of the essentially gaseous effluent from that treatment means into useful by-products, and (c) the subsequent conversion of the essentially non-gaseous effluent from the treatment chamber into useful by-products.

18 Claims, 4 Drawing Sheets

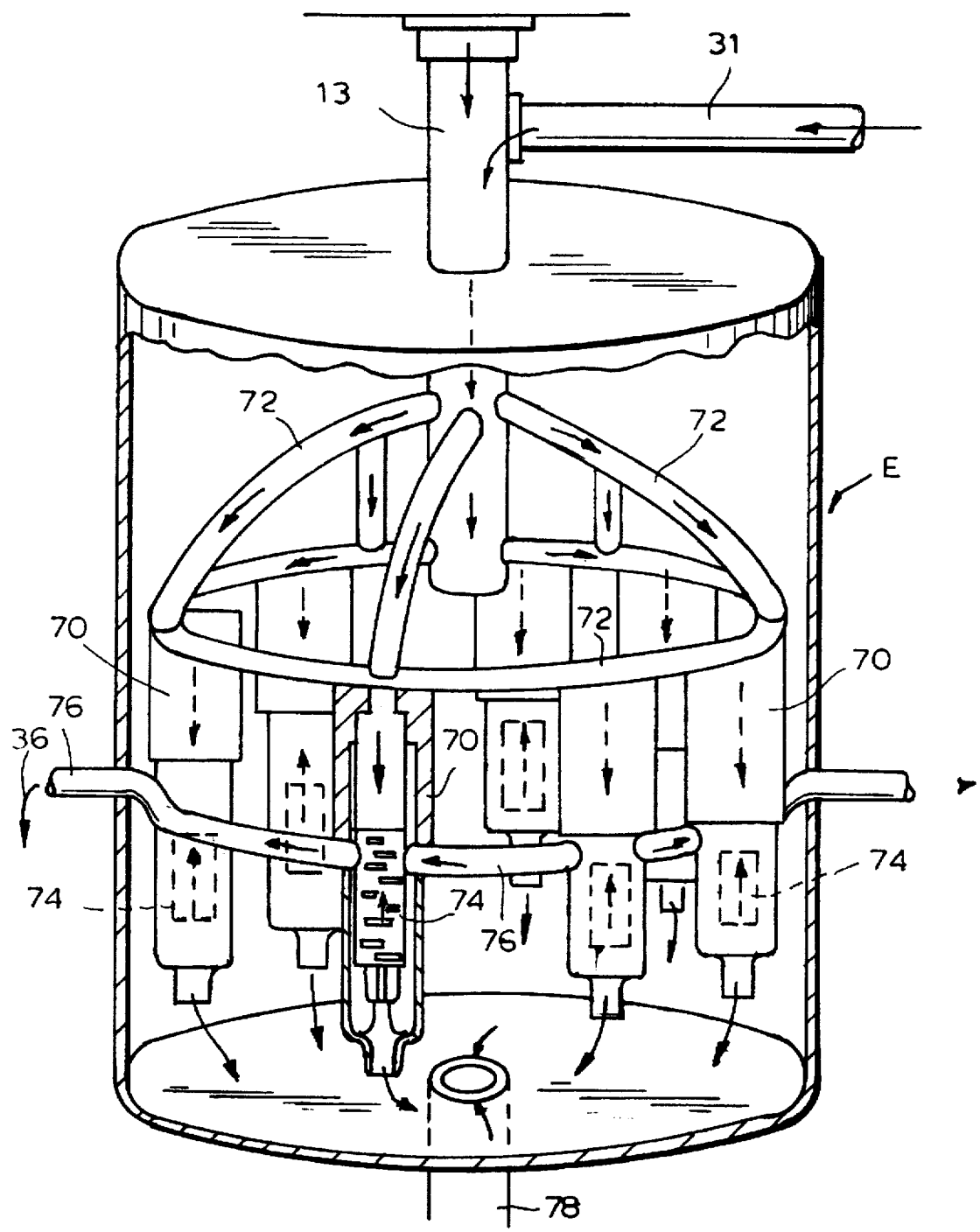
F I G. 4

HIGH-TECH COMPUTERIZED CONTAINMENT AND TREATMENT APPARATUS AND PROCESS FOR COMBUSTION OFF-GAS

This application is a continuation-in-part of my pending application Ser. No. 809,884 of Dec. 18, 1991, entitled "High Tech Computerized Containment and Treatment Apparatus and Process For Combustion Off-Gas", which is in turn a continuation-in-part of my application Ser. No. 651,656 filed Feb. 6, 1991, entitled "High-Tech Computerized Off-Gas Combustion Treatment and Apparatus", now U.S. Pat. No. 5,103,742 of Apr. 14, 1992.

FIELD OF THE INVENTION

This application and its predecessors concern substantially closed loop method and apparatus for the handling of combustion off-gas or flue gas, and particularly such method and apparatus which are readily adapted to existing incineration, heating or power installations, and which can effect extensive diminution in noxious off-gas contaminants, or substantially total containment of such off-gas including any liquid, gaseous, ionic, colloidal or sizeable particulate off-gas constituents including contaminants such as fly ash and noxious gases, which constituents heretofore have been vented mainly to the atmosphere, and the capture of useable by-products from the off-gas. Also, the method and apparatus are uniquely adapted for employing the kinetic energy of the off-gas and steam or otherwise developed back pressure to generate power through turbine equipment or the like.

BACKGROUND OF THE INVENTION

The air pollution problems associated with such combustion by-products as, for example, the various oxides of nitrogen, sulfur, carbon, phosphorus, mercury and other metals, the various halides such as HCl and HBr, the phosphoryl compounds, the many other volatile metal halides, oxides and complexes, the various sulfur containing compounds such as hydrogen sulfide or carbon disulfide, and the organic toxic pollutants such as dioxin and the like which are in themselves highly volatile and elusive, or are strongly adsorbed on fly ash, are well recognized and of course, are the subject of intensive international research and development effort. Such by-products typically are produced through garbage or trash incineration, the burning of discarded tires, or building heating, power production or the like from fossil or other fuels.

Industry has responded to these problems with many pollution control devices and processes such as off-gas scrubbing, filtering, electrical precipitation, electric arc afterburning, catalytic burning, baffled flues and chimneys, and the like, many of which are of limited practical value, particularly for the effective removal of many of the above by-products, fly ash and other particulate fines, and practically all of which devices require large and expensive special auxiliary off-gas handling equipment and housing structures therefor. Ofttimes these control devices are not adaptable to existing flue equipment and the cooperating or supporting equipment or installations comprise several buildings or at least several interconnected but separate installations of scrubbers, cyclone separators, filter equipment, economizers, and the like, which necessarily complicate the off-gas treatment aspect, from both the labor and apparatus standpoint, particularly maintenance, and lead to unmanageable cost of off-gas clean up. Typical such prior installations are depicted and discussed in the Allen Hershkowitz article in *Technology Review*, Jul. 30, 1987, and in U.S. Pat. Nos.: 3,710,555; 3,706,182; 3,695,004; 3,984,220; 4,095,514; 4,286,973; 4,206,722; 4,635,569; and 3,442,232, the disclosures of all of which are incorporated herein by reference, particularly the relevant structures thereof, e.g., the spray or jet nozzles.

Some objects of the present invention, therefore, are:

(1) to provide a treatment process and apparatus for decontaminating the air (off-gas) of combustion systems, which process and apparatus are useable as original process and equipment of, or readily adaptable to, existing combustion units comprised of fire box and flue structures, at minimum reconstruction effort and cost, and which are highly effective in essentially eliminating combustion produced air contaminants of all types which are carried in the off-gas. As a result, substantial amounts of the contaminant diminished air can be recycled to the combustion unit or sent to other substantially contained equipment for use in various chemical or other industrial processes such that actual off-gas emissions to the atmosphere are essentially eliminated and valuable by-products are captured;

(2) to provide such process and apparatus which provide chemical treatment means for the off-gas, adaptable to automatic, electronic and computerized control;

(3) to provide such process and apparatus with continuous or semi-continuous off-gas monitoring analysis, computer interpretation of the analysis data, and computer regulation of chemical reactor means within the flue system for reacting out normally pollutant contaminant chemicals in response to said computer interpretation;

(4) to provide such method and apparatus in a substantially closed-loop form to thereby essentially eliminate atmospheric contamination;

(5) to provide such method and apparatus which are energy efficient and capable of effectively generating power, particularly electric power, and also capable of feeding various industrial gas processing installations such as dry ice manufacture, sulfuric acid manufacture, and oxo processes;

(6) to capture useful by-products not only from the off-gas after it leaves the chamber where it is initially treated or scrubbed but also from the non-gaseous drainage from the treatment chamber; and (7) to provide a multi-compartment, preferably computer-controlled treatment chamber for the off-gas, thereby to optimize the chemical and physical events occurring in said chamber.

SUMMARY OF THE INVENTION

These and other objects hereinafter becoming evident have been attained in accordance with the present invention which, in its process embodiment is defined as the process for selectively controlling the concentration of one or more chemical contaminants, either gaseous, liquid or solid, in the off-gas of a combustion system having associated fire box means and flue system, comprising carrying out some or all of the following procedures, in any order, in a continuous or semi-continuous manner:

(a) analyzing the chemical composition and physical status of the off-gas at one or more locations in said flue system;

(b) directing the off-gas from the fire box means into treatment chamber means dynamically maintained within a predesigned off-gas pressure range;

(c) contacting the off-gas in said treatment chamber means with reactant means previously adjusted in reactivity and specificity according to the chemical and physical analysis of the off-gas, for converting prescribed amounts of one or more of said contaminants in said off-gas to one or more desired decontamination products;

(d) preferably exiting the treated off-gas from said treatment chamber means to expansion chamber means maintained within a dynamically predesigned off-gas pressure range lower than pressures maintained in said treatment chamber means to effect a reduction in the kinetic energy of the treated off-gas and thus facilitate removal of said products therefrom;

(e) removing a desired amount of said products from the off-gas;

(f) exiting the non-gas contents of said treatment chamber means, which contain potential by-products;

(g) removing said by-products from said non-gas contents; and (h) carrying out procedures (a), (b) and (c) in a series of interconnected compartments, with access to and exiting from said compartments being controlled in accordance with the sensing of the conditions existing in said compartments so as to maximize treatment effectiveness, Other objects and structural embodiments set forth in my parent applications are also applicable, and are here incorporated by reference. With respect to what is here specifically disclosed, I place special stress on the following:

1. After the off-gas reacts with the chemical means in the treatment chamber some of the reaction products are carried out from the treatment chamber along with the off-gas and subsequently acted upon, as generally disclosed in the parent applications. Other substances (reaction products and residues) drain from the treatment chamber. It is a prime object of the present invention to (a) convert those drain products, insofar as possible, to useful by-products and (b) return some or all of what remains to the furnace for further combustion and treatment, thereby to maximize the economic benefit from the system and minimize contamination of the environment.

2. Further to improve the efficiency of the system in creating useable by-products and minimizing environment contamination, the reaction in the treatment chamber between the off-gas and the supplied chemicals is rendered most effective by providing a treatment chamber in the form of a series of interconnected compartments each designed to function as a mini-treatment chamber, with the exit and entry to those compartments being individually controlled in accordance with the existing reaction conditions, to the end that each compartment will be selectively controlled to ensure optimum reaction conditions within it.

To the accomplishment of the above, and to such other objects as may hereinafter appear, the present invention relates to an off-gas treatment system as defined in the appended claims and as described in this specification, taken together with the accompanying drawings.

BRIEF DESCRIPTION OF THE DRAWINGS

FIG. 4 is a diagrammatic view of the preferred embodiment of the converter means designed to receive and act upon the drainage from the treatment chamber.

DESCRIPTION OF THE PREFERRED EMBODIMENTS

As will be apparent to those skilled in the art, the system here specifically disclosed involves the basic, as well as many of the specific, structures, system arrangements and modes of operation. disclosed in the parent applications, here incorporated by reference. Consequently the description here will in the main be devoted to the improvements in the system here claimed.

Figure 1:
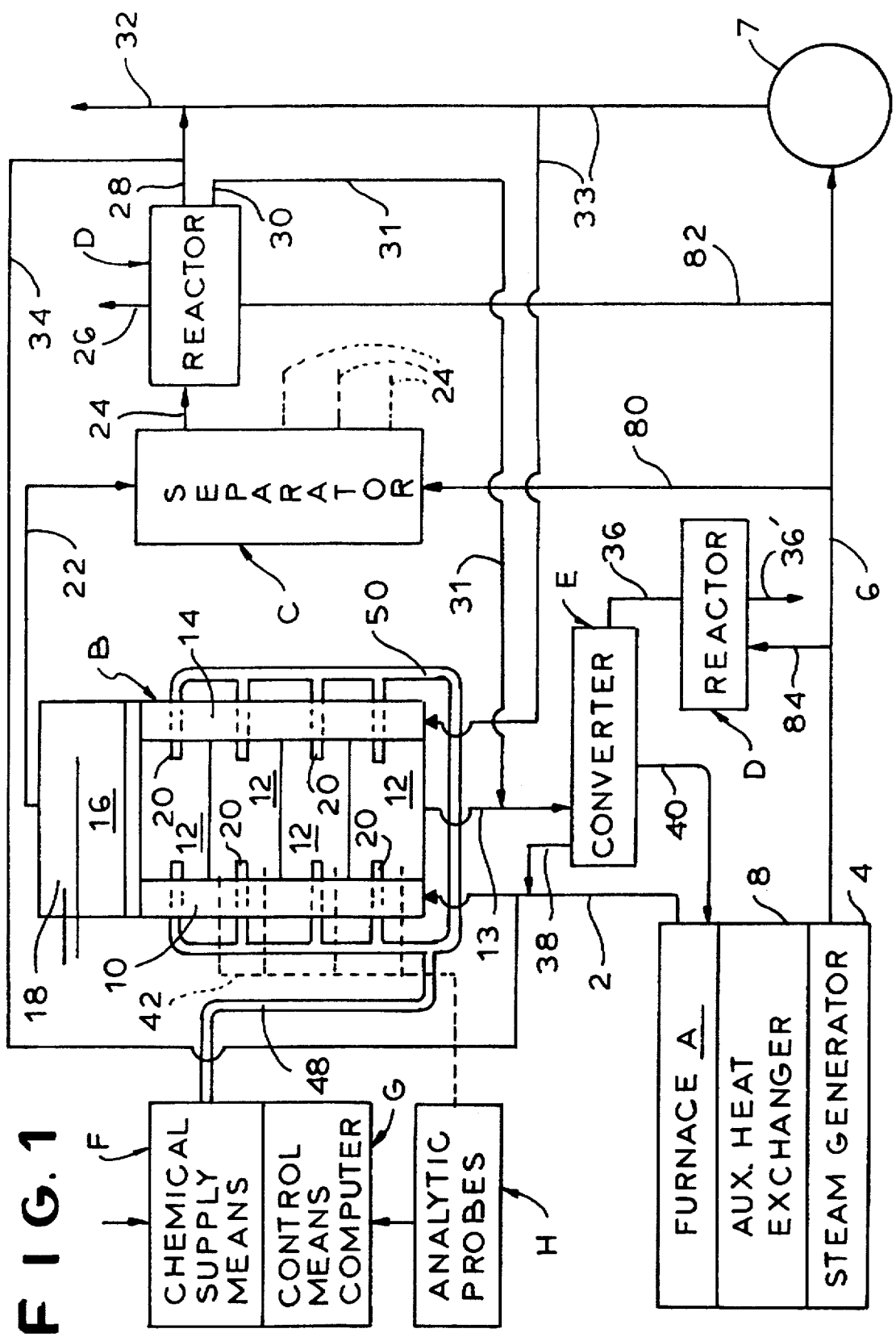
FIG. 1 is a simplified block diagram showing the basic novel features of the instant invention.
Figure 2:
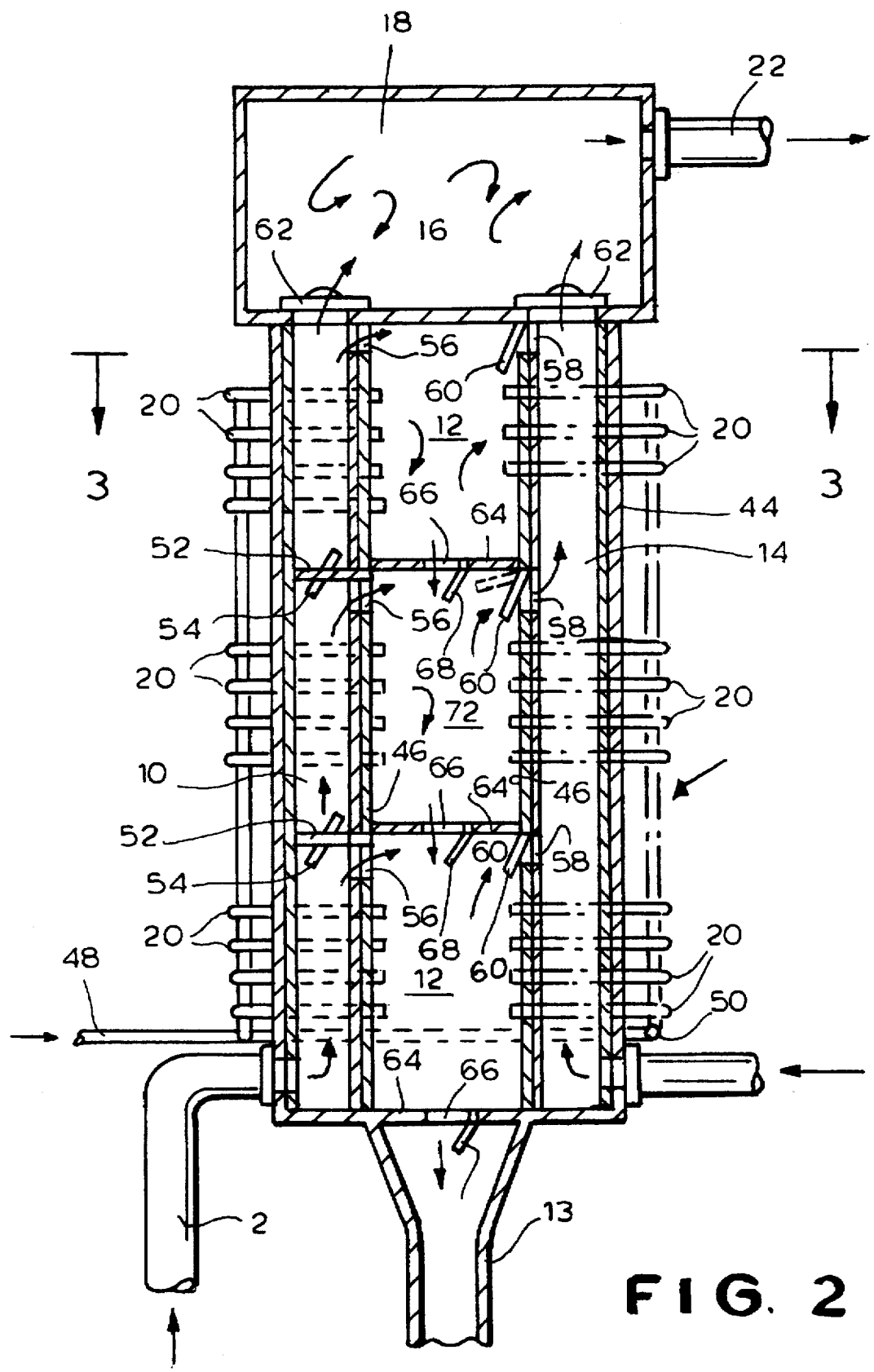
FIG. 2 is an essentially diagrammatic vertical cross-sectional view of a preferred embodiment of the treatment chamber of the present invention.

Referring to FIG. 1, a generalized block diagram, the system of the present invention is designed to be used in conjunction with a furnace generally designated A which produces an off-gas indicated by the line 2. Furnace A may be of a type designed to produce steam in a steam generator 4, the line 6 representing flow of the steam produced by the generator 4 to a utility device 7 which may, for example, be a steam turbine. The furnace may also be provided with an auxiliary heat exchanger 8. The off-gas 2 is fed to a treatment chamber generally designated B which may well be in the form of a multi-cylindered columnar stack fitted over the outlet from the furnace A. At the treatment chamber B the off-gas 2 is fed into an inlet flue 10 from which it is controllably fed into treatment compartments 12 in which the off-gas is subjected to chemical and/or physical treatment. The compartments 12 are arranged in sequential order. The number of compartments 12 may be varied. Four are shown in FIG. 1 and three are shown in FIG. 2. The treated off-gas exits the compartments 12 and enters an exit flue 14 through which the gas is conveyed to an expansion chamber 16 preferably provided with cooling means 18.

Each of the treatment compartments 12 is provided with supply means 20, usually in the form of nozzles, through which appropriate scrubbing and/or treatment materials designed to physically and/or chemically react with the off-gas are injected into the treatment compartments 12 so that the off-gas which leaves the expansion chamber 16 consists of the off-gas emanating from the furnace A as modified by its reaction, physical and/or chemical, with the substances thus supplied to the treatment compartments 12. In the interest of simplicity, that which leaves the expansion chamber 16, as indicated by the line 22, will still be called "off-gas". A drain 13 is provided in the treatment chamber B for removing predominantly liquid waste products.

The present system is specifically designed to make use of as many of the components as possible which make up the off-gas 22. Consequently the off-gas 22 is conveyed into a separator generally designated C, such as a molecular sieve, in which the off-gas is separated into its several potentially useful components, as indicated by the solid and dotted lines 24. Each of those separated off-gas components 24 are fed to a reactor generally designated D where they are acted upon in some appropriate manner, physical and/or chemical, to produce, as indicated by the arrow 26, a useful by-product, which is removed from the system and ultimately used. The reactor D may have a gaseous exhaust product 28 and a liquid exhaust product 30. The gaseous exhaust product 28 may, depending upon its nature, be vented to the atmosphere, as indicated by line 32. The gas 28 leaving the reactor D may also be fed back, as indicated by line 33, to exit flue 14, thereby to be conveyed again to the separator C and reactor D for more complete by-product extraction, or returned to the inlet flue of the treatment chamber B for reprocessing, as indicated by the line 34. The liquid and/or solid exhaust product may be fed back to the drain 13 of the treatment chamber B, as indicated by line 31, for further treatment.

That drain 13 feeds a converter means generally designated E, where the predominantly liquid products from the treatment chamber B and optionally from the reactor D, in the past treated as waste, are acted upon to produce one or more useful by-products indicated by the line 36. A gaseous exhaust 38 may be produced which may be fed back to the inlet flue 10 of the treatment chamber B for reprocessing, and liquid and/or solid waste 40 may be produced which may be fed back to the furnace A for combustion and reintroduction into the system thereafter. If needed, the useful by-product 36 may be fed to a reactor D' producing a desired by-product 36', and the waste product from the reactor D' may be dealt with similarly to the waste products from the reactor D.

As will be explained more in detail below, the supply means 20 for each of the treatment compartments 12 may be a series of fluid jets connected by suitable piping to chemical supply means generally designated F. Solenoid or equivalent valving can be employed in conjunction with one or more chemical reservoirs to provide the proper chemical or mix of chemicals. Thus a relatively complex set of flow control valving may be employed to pre-mix the various chemicals, if such is desired, according to what reactions are required to control off-gas pollutants or contaminants and to produce desired by-products. The supply means F is controlled by control means G which acts in response to the outputs of a plurality of analytic probes generally designated H which are appropriately strategically placed. Thus they may be located so as to chemically and physically (e.g. temperature and pressure) analyze the off-gas as it enters the treatment chamber B and as it is present in each of the treatment compartments 12, all as indicated by the dotted lines 42. The control means G is electronically associated with the computer means provided with programmed capability for interpreting the off-gas analysis data and translating it into the chemical feeds necessary for converting the primal off-gas contaminants to the types and levels desired. The fed chemicals, may, if desired, be controllably cooled by the cooling means 18, as described in the '742 patent. In addition, as will become apparent hereinafter, the control means is also effective to control the flow of off-gas selectively to and from the individual treatment compartments 12 and also to control the flow of drainage material.

The reactant chemical compositions which may be employed in practicing the present invention are practically unlimited in variety, and a large number are well known and Utilized for the control of elemental and various compounds of mercury, lead, cadmium, sulfur, nitrogen, halogen, carbon, phosphorus and the like, as well as larger organic molecules such as dioxin, aldehydes, ketones, noxious sulfur containing organic molecules such as mercaptans, and the like. Examples of such chemical reactants are given in U.S. Pat. Nos.: 3,728,433; 3,728,441; 3,728,440; and in T909, 017, the disclosures of all of which are incorporated herein by reference.

The various useful reactant chemicals typically employed in off-gas scrubbing and reacting operations include water per se, aqueous slurries of $CaCO_3$, CaO, $NH_3$, and other such basic materials including NaOH and KOH, metal chelators such as ethylene-diametetraacetic acid, ferrous iron compounds, cyanuric acid, yellow phosphorus aqueous emulsion, alkylamines, sulfamic acid, $KMnO_4$, $HNO_3$, and aqueous hypochlorite. The particular chemical or chemicals employed, i.e., selected in accordance with the present invention in response to the analysis data from the probe H, will be determined by the off-gas composition at the analysis sampling sites in the exhaust system and the desired or targeted off-gas composition.

It is noted that the emission of certain of the off-gas constituents such as carbon dioxide and nitrogen are not considered to be noxious air contaminants, and while the present process and apparatus are directed to an essentially closed-loop system for essentially eliminating non-breathable contaminants such as nitrous oxide, sulfur dioxide, carbon monoxide, phosphorous exides, or the like, the release of reasonable amounts, i.e., non-useable portions of normal air constituents, particularly from the various industrial gas processing facilities, is within the ambit of the present invention. In this regard, gas processing or recovery methods are well known for the separation and recovery of $CO_2$ for use in many industrial applications such as the manufacture of dry ice. Such methods includ the $K_2CO_3$ and ethanolamine processes, with, e.g., $KMnO_4$ purification.

The isolated carbon monoxide from the contained system is readily reactable with water in the presence of catalyst to produce hydrogen and carbon dioxide. This reaction produces high purity hydrogen (synthetic gas) with a higher hydrogen-to-carbon monoxide ratio than the feed. Also, methanol can be manufactured by the reaction between carbon monoxide and hydrogen at 230°–400° C. and, e.g., pressure of about 300–600 atmospheres. The manufacture of acetic acid by methanol carbonylation is well known for the manufacture of acetic acide. Catalytic carbonylation reactions, e.g., hydroformylation, or oxo reaction, produce aldehydes and alcohols from carbon monoxide, hydrogen, and olefins.

Also, acrylic acid and esters can be manufactured by the Reppe reaction from acetylene, methanol, and carbon monoxide: $HC\equiv CH+CH_3OH+CO \rightarrow CH_2\!\!=\!\!CHCOOCH_3$; carbon monoxide can be catalytically hydrogenated to a mixture of straight-chain aliphatic, oleofinic, and oxygenated hydrocarbon molecules in the Fischer-Tropsch reaction: $n\ CO+2n\ H_2 \rightarrow (CH_2)_n + n\ H_2O$; and carbon monoxide can be hydrogenated to methane for use as a natural gas substitute.

The type of analytic probe H useful in the present invention may, of course, be widely varied, and is dependent to some degree on the principal types of combustible material to be fed to the fire box or combustion chamber. Typical useful gas sampling and analysis systems, both quantitative and qualitative, are disclosed in: the sales brochures of Enmet Corporation, Ann Arbor, Mich., and Gastech Corporation, Newark, California; and in the Product Line Catalog of Thermo Environmental Instruments Inc., Franklin, Mass., pages 1–45, especially pages 27–31 wherein is shown and described a Flue Gas Analysis System particularly adapted for use in the present invention. Various computerized systems for recording and interpreting the analytical data, and for actuating the valving means for pumping the required chemical solutions or slurries to the injector nozzles, as well as performing other functions, are known to the art of computers and related servosystems.

Figure 3:
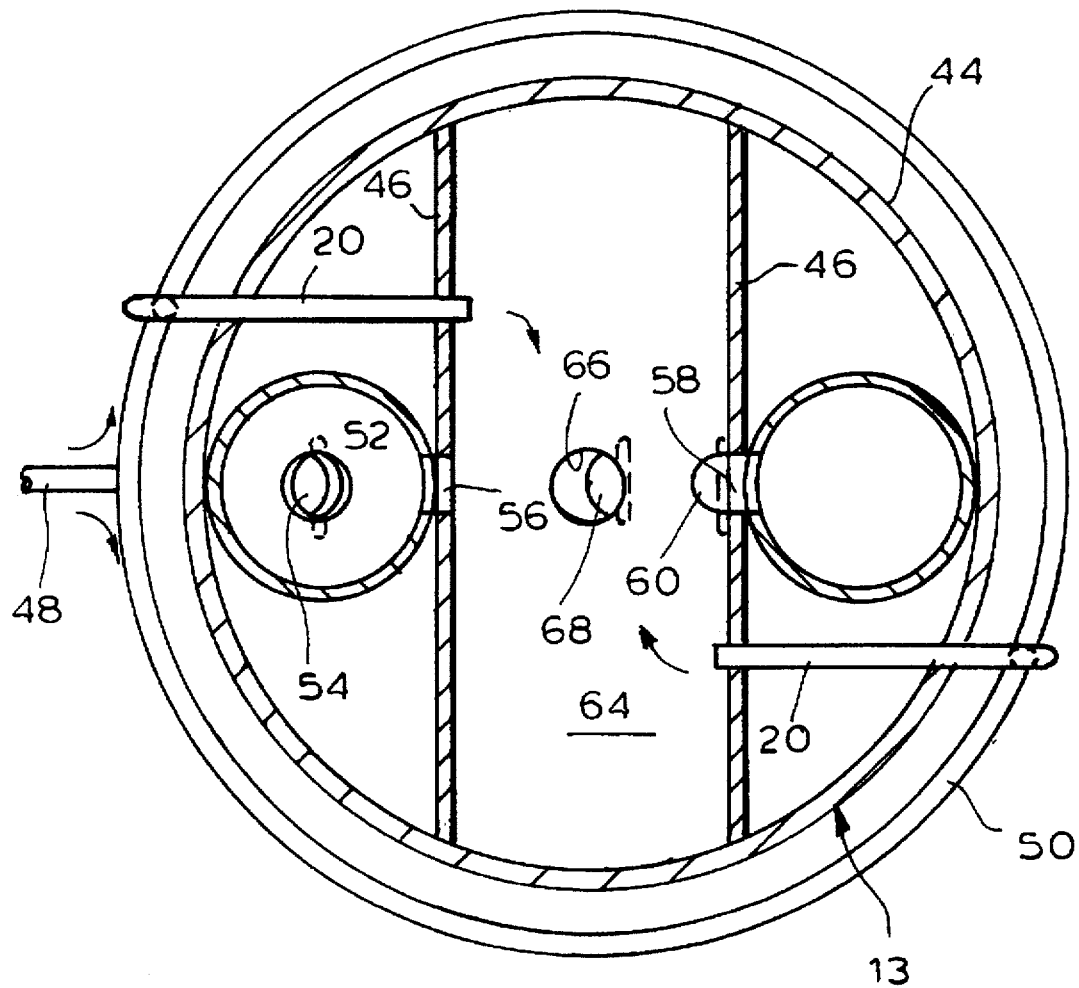
FIG. 3 is an essentially diagrammatic cross-sectional view of the treatment chamber taken along the line 3—3 of FIG. 2.

FIGS. 2 and 3 diagrammatically illustrate the treatment chamber B in more detail. It may comprise a cylindrical wall 44 within which are received the inlet and exit flues 10 and 14 respectively on opposite sides of walls 46 in part defining, along with the wall 44, the individual compartments 12. The nozzles 20 extend through the walls 44 and 46 so as to open into the compartments 12, and they are in fluid communication with feed tube 48 and tube 50 surrounding the wall 44. The inlet flue 10 is divided by horizontal walls 52 into sections corresponding to each of the compartments 12, and controlled valves 54 are provided in each of those walls 52. Apertures 56 connect each of the compartments 12 to the inlet flue 10. Each of the compartments 12 is provided with an aperture 58 communicating with the exit flue 14, and each of those apertures 58 is provided with a controlled valve 60. The upper ends of each of the flues 10 and 14 may be provided with individually set relief valves 62. The bottom walls 64 of each of the compartments are provided with apertures 66 and controlled valves 68 in those apertures. The analytical probes H will, among other things, sense the chemical and physical conditions within each of the treatment compartments 12 and, with the control means G, control the associated valves 54, 60 and 68 appropriately in order to maximize the containment and treatment of the off-gas. The multi-flue system allows for independent temperature control of each separate treatment compartment 12, it enhances the effectiveness of the treatment processes carried out in those compartments, provides maximum off-gas temperature and pressure control in the area of the compartments, thereby permitting the flue exhaust an unrestricted direct flow pattern to communicate satisfactorily with each individual treatment compartment. The concept of individual stacking of treatment chambers allows the exhaust flue gas to be directly discharged into a specific compartment 12, thus providing each compartment 12 the energy balance and ability to maintain control over volume, mass flow, temperature, pressure and associated variables. The controlled multi-flue arrangement individually feeds each stacked compartment 12. The computer in the control means G along with the probes H may effectively control temperature and pressure, sensing the need to interact with each compartment 12 in accordance with the mass flow and temperature (kinetic energy) of the incoming off-gas.

For example, making reference to FIG. 2, initially all of the valves 54, 60 and 68 will be closed. The off-gas enters the lowermost portion of the inlet flue 10 and passes through the lowermost aperture 56 into the lowermost compartment 12. Since the valve 60 is closed more and more of the off-gas will enter the compartment 12 where it will be acted upon by the effluent from the nozzles 20. When the probes H indicate that the time is propitious, as when the pressure in the compartment 12 reaches a predetermined value, the valve 60 will be opened and the treated off-gas will be able to enter the exit flue 14 and progress through the system. If the flow of off-gas is such that the lowermost compartment 12 can effectively handle it the system will continue to function as described. However, if more off-gas is present than the lowermost compartment 12 can properly handle, the valve 54 will be opened, the excess of that off-gas will enter the next uppermost portion of the inlet flue 10 and will pass through its aperture 56 and enter the second compartment 12, the valve 54 communicating with the next upper portion of the inlet flue 10 remaining closed. Operations in the second compartment 12 will then continue as described with respect to the lower compartment, and if there is still an excess of available flue gas the uppermost valve 54 will be opened, permitting that excess to flow into the uppermost compartment 12 via the appropriate opening 56. In general it will be the pressure in a given compartment 12 which will determine when its exit valve 60 and flue valve 54 will be opened, but other parameters may be used to control these valves where appropriate. Moreover, the control means G will ensure that only those nozzles 20 within a then-functioning treatment compartment 12 will be provided with fluid.

Such material, primarily liquid but possibly containing some entrained solids, which accumulates in each compartment 12 will, at an appropriate time determined by the controlled opening of each of the valves 68, flow down into the drain 13 from the treatment chamber B.

The materials in the drain 13 are fed to the converter E, preferably a chemical catalytic converter, a preferred embodiment of which is schematically shown in FIG. 4. The materials flowing through the drain 13 into the converter E can consist of a variety of combinations of chemicals. The converter E supports a plurality of chambers 70 the upper ends of which are in fluid communication with piping 72 through which the drainage material flows. The chambers are readily accessible and are adapted to receive removable cartridges 74 containing appropriate chemicals designed to produce the desired reactions with the drainage material. The nature of that drainage material may be such that more than one by-product-producing reaction is called for, in which case the piping 72 may be provided with appropriate valving. The reactions which take place in the cartridges 74 will produce a gaseous by-product fed out through the piping 76 to feed line 36 in FIG. 1, and the waste products from the cartridge 74 flow into drain pipe 78 which communicates with line 40 of FIG. 1. The preferably catalytic reactants in the cartridge 74 offer the opportunity to optionally direct the drainage materials to either a singular or several associated connected cartridges or to a plurality of different cartridges, which, functioning with the computer portion of the control means G, permit the creation or manufacturing of specific gaseous by-products.

Typical functions which may be performed by the converter E are the following: Zinc in the cartridges 74 may react with sulfuric acid in the drainage material to produce hydrogen, which can then be used as such or as modified in the reactor D'. Copper can be used to react with nitric acid or sulfuric acid to produce sulfur or sulfur dioxide. Vanadium and/or titanium catalysts are useful with many recovery reactions, as are platinum, iron and selected earth alkalides. Membrane separation of constituents or adsorption procedures may also be employed, by way of example.

Separation of the off-gas into desired components may require heat, and hence, as indicated by the line 80, some of the steam from the steam generator may be used for that purpose, and the: lines 82 and 84 indicate that some of that steam may be used for the reactors D or D' if appropriate. The electric generator 7 may also provide such electrical power as is needed in the system, either for heating, cooling, to drive flow-enhancing means where required or desired, or otherwise.

The exhaust line 32 may, if needed, be provided with filtering means of any desired type, shape or size. Also, exhaust fans may be provided where appropriate to overcome undesirable pressure.

While but a single embodiment of the present invention is here specifically disclosed, it will be apparent that many variations may be made therein, in particular depending upon the quantity, nature and chemical composition of the off-gas, which in turn depends to a large extent upon the nature of the fuel burned in the furnace. Simply by way of example, the use of discarded automobile and truck tires as fuel is becoming quite common and the off-gas resulting from combustion of such materials is exceedingly rich in constituents which, while normally contaminants, are capable of conversion into a wide variety of useful products. Accordingly, it will be appreciated that the nature of the invention is as defined in the following claims.

I claim:

1. An integrated, at least substantially self-contained system for use with a furnace wherein a fuel is burned and produces an off-gas, said system comprising:

(a) a treatment chamber operatively connected to said furnace for receiving said off-gas through entry means;

(b) chemical supply means communicating with said treatment chamber and adapted to provide reactive chemical thereto for contact with the off-gas in said treatment chamber, thereby to produce (i) reaction product carried with said off-gas and (ii) drain product;

(c) exhaust means communicating with said chamber through which said off-gas and said reaction product exit from said chamber;

(d) drain means communicating with said chamber through which said drain product exits from said chamber;

(e) reactor means communicating with said exhaust means for receiving said off-gas and said reaction product from said chamber and acting upon them to produce chamber by-product and exhaust product;

(f) means communicating with the reactor means for removing said chamber by-product from said system;

(g) converter means communicating with said drain means for converting said drain product into converter means by-product and waste product; and (h) means for removing from said system said converter means by-product.

2. In the system of claim 1, means for returning at least part of said converter means waste product to said furnace.

3. In the system of claim 1, means communicating between said reactor means and said converter means for conveying to said converter means certain reactor means exhaust product, if present.

4. In the system of claim 2, means communicating between said reactor means and said converter means for conveying to said converter means certain reactor means exhaust product, if present.

5. The system of any of claims 1–4, in which the said treatment chamber comprises a plurality of serially arranged compartments, said entry means comprising first flue means communicating with each of said compartments and operatively connected to said furnace for receiving said off-gas and conveying it to said compartments, valve means in said first flue means for interrupting and permitting off-gas flow between adjacent compartments, means operatively connected to each of said compartments for sensing the reaction conditions therein, and means for controlling said valve means in accordance with those sensed conditions in order to render said compartments selectively available to receive said off-gas.

6. The system of claim 5, in which said exhaust means comprises second flue means communicating with each of said compartments and valve means selectively permitting or preventing off-gas flow from each of said compartments to said second flue, and means for controlling said valve means in accordance with the sensed conditions in said compartments.

7. The system of claim 5, in which each compartment has a drain means connecting that compartment with the preceding compartment except that the first compartment has a drain means operatively connected to said converter means, each of said drain means having a valve means for interrupting and permitting flow therethrough, and means for controlling said valves in accordance with the reaction conditions in each of said compartments.

8. The system of claim 6, in which each compartment has a drain means connecting that compartment with the preceding compartment except that the first compartment has a drain means operatively connected to said converter means, each of said drain means having a valve means for interrupting and permitting flow therethrough, and means for controlling said valves in accordance with the reaction conditions in each of said compartments.

9. The system of any of claims 1–4, in which an expansion chamber is operatively interposed between the exhaust means and said reactor means.

10. The system of any of claims 1–4, in which there are a plurality of reactor means, each designed to convert said reaction product from said chamber into a different by-product, and, interposed between said exhaust means and said reactor means, means for separating said reaction product into different components corresponding respectively to the different reactor means and for conveying said components respectively to the appropriate reactor means.

11. The system of any of claims 1–4, in which said converter means comprises a structure supporting a plurality of individual converter means effective to react with said drain product in a predetermined fashion, means for conveying drain product selectively to said individual converter means, said individual converter means producing gaseous and non-gaseous output, means for conveying the gaseous output from said individual converter means to a point outside said structure and means for conveying said non-gaseous output to a second point outside said structure.

12. The system of claim 11, in which said individual converter means comprise housings with accessible interiors adapted to receive replaceable units containing desired converter materials.

13. In the system of any of claims 1–4, means for returning at least part of said reactor means exhaust product to said reactor means.

14. In an integrated, at least substantially self-contained system for use with a furnace, wherein a fuel is burned and produces an off-gas, said system comprising: (a) a treatment chamber operatively connected to said furnace for receiving said off-gas through entry means; (b) supply means communicating with said treatment chamber and adapted to provide liquid thereto for contact with the off-gas in said treatment chamber, thereby to (i) modify said off-gas physically or chemically and (ii) produce a drain product; (c) exhaust means communicating with said chamber through which said off-gas and said reaction product exit from said chamber; (d) means for subsequently treating said off-gas and reaction product to produce by-products, the improvement comprising: said treatment chamber comprising a plurality of serially arranged compartments, said entry means comprising first flue means communicating with each of said chambers and operatively connected to said furnace for receiving said off-gas and conveying it to said compartments, valve means in said first flue means for interrupting and permitting off-gas flow between adjacent compartments, means operatively connected to each of said compartments for sensing conditions therein, and means for controlling said valve means in accordance with said sensed conditions in order to render said compartments selectively available to receive said off-gas.

15. The system of claim 14, in which aid exhaust means comprises second flue means communicating with each of said compartments and valve means selectively permitting or preventing off-gas flow from each of said compartments to said second flue, and means for controlling said valve means in accordance with said sensed conditions in said compartments.

16. The system of either of claims 14 or 15, in which each compartment has a drain means connecting that compartment with the preceding compartment except that the first compartment has a drain means operatively connected to said converter means, each of said drain means having a valve for interrupting and permitting flow therethrough, and means for controlling said valves in accordance with said sensed conditions in said compartments.

17. The system of either of claims 14 or 15, in which the said exhaust means comprises an expansion chamber in which said off-gas and reaction product can expand before exiting for subsequent treatment.

18. The system of claim 17 in which the expansion chamber has means for cooling said off-gas and said reaction product.

* * * * *